(12) United States Patent
Preux et al.

(10) Patent No.: US 9,187,985 B2
(45) Date of Patent: Nov. 17, 2015

(54) METHOD FOR OPTIMIZING THE DEVELOPMENT OF AN UNDERGROUND MEDIUM BY MEANS OF A RESERVOIR STUDY COMPRISING OPTIMIZED UPSCALING

(71) Applicant: IFP Energies nouvelles, Rueil-Malmaison Cedex (FR)

(72) Inventors: Christophe Preux, Acheres (FR); Mickaele Le Ravalec, Rueil-Malmaison (FR)

(73) Assignee: IFP ENERGIES NOUVELLES, Rueil-Malmaison Cedex (FR)

( * ) Notice: Subject to any disclaimer, the term of this patent is extended or adjusted under 35 U.S.C. 154(b) by 404 days.

(21) Appl. No.: 13/667,137

(22) Filed: Nov. 2, 2012

(65) Prior Publication Data
US 2013/0132055 A1    May 23, 2013

(30) Foreign Application Priority Data

Nov. 17, 2011   (FR) ...................................... 11 03498

(51) Int. Cl.
*G06G 7/48*       (2006.01)
*E21B 43/00*      (2006.01)
*G01V 11/00*      (2006.01)
*G01V 99/00*      (2009.01)

(52) U.S. Cl.
CPC .................. *E21B 43/00* (2013.01); *G01V 11/00* (2013.01); *G01V 99/005* (2013.01); *G01V 2210/665* (2013.01)

(58) Field of Classification Search
CPC ................................................ G01V 2210/665
USPC .......................................................... 703/10
See application file for complete search history.

(56) References Cited

U.S. PATENT DOCUMENTS

| 2009/0070086 A1 | 3/2009 | Le Ravalec et al. |
| 2010/0225647 A1 | 9/2010 | Flew et al. |

FOREIGN PATENT DOCUMENTS

| EP | 2 034 130 A2 | 3/2009 |
| WO | WO 2008/008121 A2 | 1/2008 |

OTHER PUBLICATIONS

EP search report with 3 "X" reference citations; 2012; one page.*

(Continued)

*Primary Examiner* — Hugh Jones
(74) *Attorney, Agent, or Firm* — Fitch, Even, Tabin & Flannery, LLP

(57) ABSTRACT

A method for optimizing the development of a fluid reservoir by means of an accelerated reservoir study. A geological model is constructed. A reservoir model is then constructed by upscaling the geological model. The links between cells of the geological model and a cell of the reservoir model where they are contained are determined and stored. Flow simulations are carried out by computer-implemented reservoir simulator, the reservoir model and the links. The above stages are then repeated without repeating the link determination, by modifying parameters of the reservoir study to optimize the development scheme. Finally, the reservoir is developed according to this optimized development scheme.

1 Claim, 4 Drawing Sheets

(56) References Cited

OTHER PUBLICATIONS

Le-Ravalec-Dupin, Mickaele: "Pilot Block Method Methodology to Calibrate Stochastic Permeability Fields to Dynamic Data", Mathematical Geosciences, Springer-Verlag, Berlin/Heidelberg, vol. 42, No. 2, Oct. 22, 2009, pp. 165-185, XP019772566, ISSN: 1874-8953.

Fung, Larry S. K. et al: "Distributed Unstructured Grid Infrastructure for Complex Reservoir Simulation", 2008 SPE EUROPEC/EAGE Annual Conference and Exhibition, No. SPE 113906, Jun. 9, 2008, pp. 1-9, XP007920454.

* cited by examiner

METHOD FOR OPTIMIZING THE DEVELOPMENT OF AN UNDERGROUND MEDIUM BY MEANS OF A RESERVOIR STUDY COMPRISING OPTIMIZED UPSCALING

CROSS-REFERENCE TO RELATED APPLICATION

Reference is made to French Patent Application Serial No. 11/03.498, filed on Nov. 17, 2011, which application is incorporated herein by reference in its entirety.

BACKGROUND OF THE INVENTION

1. Field of the Invention

The present invention relates to the development of underground reservoirs, such as hydrocarbon reservoirs, or acid gas storage sites. In particular, the invention relates to a method for development optimization according to a production scheme for an underground medium containing fluids.

2. Description of the Prior Art

Exploration and development of reservoirs, notably petroleum reservoirs, requires knowledge of the underground geology as precise as possible to efficiently provide reserve evaluation, production modelling or development management. Indeed, determining the location of a production well or of an injection well, the drilling mud composition, the completion characteristics, selecting a hydrocarbon recovery method (such as waterflooding for example) and the parameters required to implement this method (such as injection pressure, production flow rate, etc.) requires good knowledge of the reservoir. Knowledge of the reservoir notably requires knowing the petrophysical properties of the subsoil at any point in space and being able to predict the flows likely to occur therein.

The petroleum industry has therefore combined for a long time field (in-situ) measurements with experimental modelling (performed in the laboratory) and/or numerical modelling (using softwares). Petroleum reservoir modelling thus is a technical stage that is essential for any reservoir exploration or development procedure. The goal of such modelling is to provide a description of the reservoir.

In order to best develop underground media, the petroleum industries define models allowing better control of development oil fields. The precision of the flow simulations is extremely important since the results of the simulations helps make technical and economic decisions relative to the field development. The models used are generally uncertain due to the lack of data which results in many iterative techniques being used to quantify these uncertainties and/or to calibrate the simulation results relative to the well history. The models derived therefrom are then more reliable and they can be used to predict the future production of the field.

The simulation chain conventionally used in a reservoir study involves the elements presented hereafter.

In a first stage, a geological model is constructed. This model is a three-dimensional computer-implemented numerical model representative of the spatial distribution of the petrophysical properties (porosity, permeability, initial oil saturation for example) in the geological formation of interest. Geostatistical techniques are often applied to generate the petrophysical properties in the geological model. In general, this model comprises a number of cells that is much too large to allow direct simulation of the fluid flows. The required computation times are difficult to handle in practice.

The second stage which is upscaling defines a second model, referred to as reservoir model, from the geological model. The reservoir model is constructed on a coarser grid than the geological model and comprises a more limited number of cells. The goal of the upscaling process is to transfer the petrophysical properties of the geological model to the reservoir model. It determines equivalent properties to be assigned to the coarse cells of the reservoir model from knowledge of the petrophysical properties of the fine cells of the geological model.

The third stage solves the flow equations for the reservoir model created with a computer-implemented flow simulator (software). It is thus possible to estimate how the fluids flow according to the petrophysical properties.

Each stage of the reservoir study requires many repetitions of the simulation chain. Indeed, this sequence of simulation modules is repeated several times, either within the context of a sensitivity analysis or of history matching for optimizing the development of a field. In these various cases, the same sequence is repeated with different parameters occurring in the various simulation modules (geostatistics, upscaling, flow simulation). The sequence is repeated entirely from the time when one parameter at least is modified. If a parameter varies at the level of the geological model construction, all the components of the sequence are relaunched.

SUMMARY OF THE INVENTION

The invention relates to a method for optimizing the development of a reservoir, wherein a reservoir study is carried out by accelerating the stages of the reservoir study. This is achieved by limiting the computation cost (computer time) required by the upscaling stage by storing the geometrical links that exist between the geological model and the reservoir model.

In general terms, the invention is a method for optimizing the development, according to a development scheme, of an underground medium containing a fluid, wherein petrophysical measurements relative to the medium and/or to the fluid are acquired and wherein the following steps are carried out:
a. constructing a geological model including a first grid with a set of cells discretizing the medium with a value of at least one petrophysical property being assigned to each cell by a geostatistical simulation and of the measurements;
b. constructing a reservoir model having a second grid including a set of cells discretizing the medium with each cell of the second grid containing a set of cells of the first grid by upscaling the geological model, characterized wherein:
c. links are determined between the cells of the first grid and a cell of the second grid in which they are contained and the links are stored;
d. flow simulations are carried out using a reservoir simulator, the reservoir model and the links;
e. steps a, b and d are repeated without repeating c, by modifying parameters of at least: a production scheme, the geostatistical simulation, the upscaling, the flow simulations, to optimize the development scheme; and
f. the underground medium is developed according to the optimized development scheme.

BRIEF DESCRIPTION OF THE DRAWINGS

Other features and advantages of the method according to the invention will be clear from reading the description hereafter of non-limitative embodiment examples, with reference to the accompanying figures wherein.

DETAILED DESCRIPTION OF THE INVENTION

Figure 1:
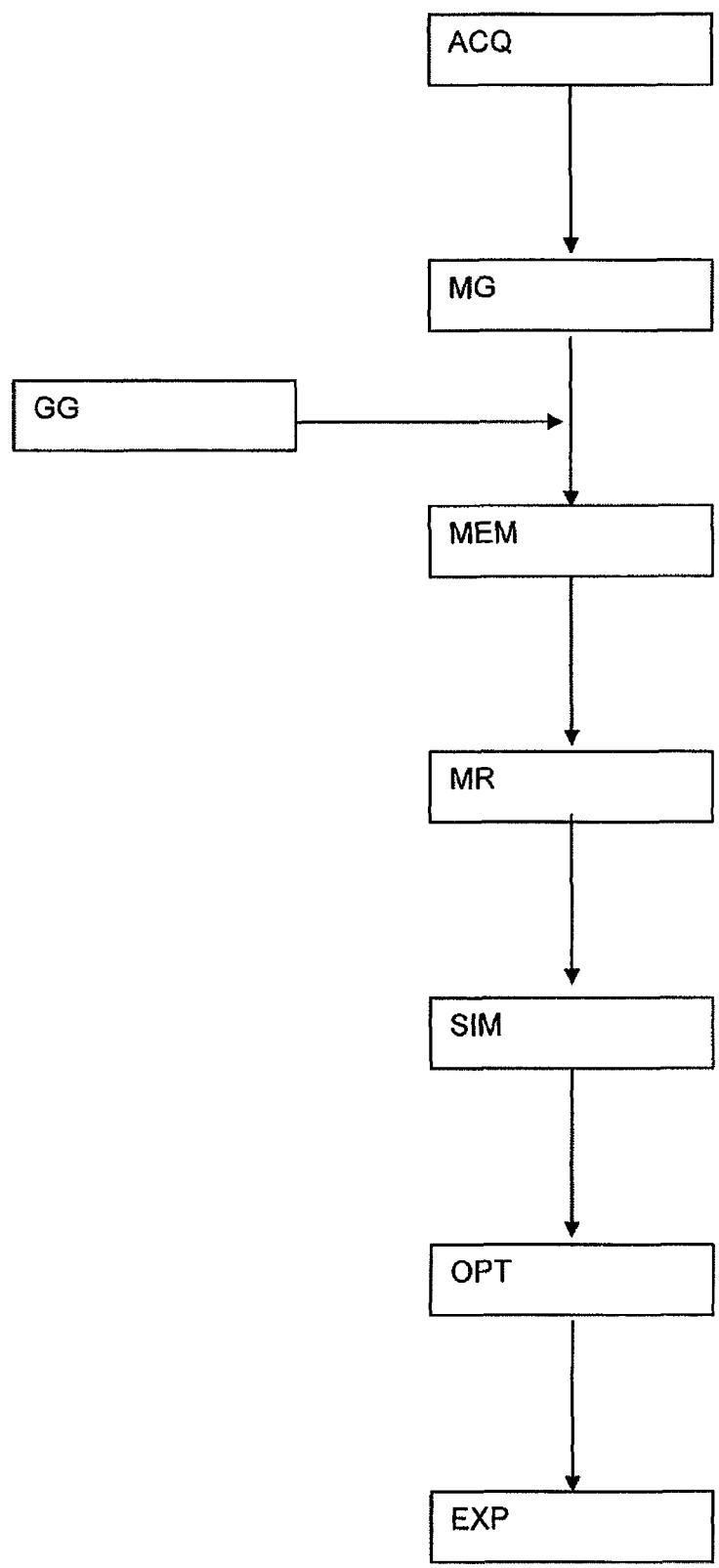
FIG. 1 illustrates the stages of the method according to the invention.

FIG. 1 illustrates the stages of the method according to the invention for optimizing the development, according to a production scheme, of an underground medium containing fluids.

1. Acquisition of petrophysical measurements relative to the medium and/or to the fluid (ACQ)
2. Construction of a geological model (MG)
3. Construction of a coarse grid (GG)
4. Determination and storage of links between the cells of the two grids (MEM)
5. Construction of a reservoir model (MR)
6. Flow simulations (SIM)
7. Optimization of the production scheme through iteration of stages 2, 3 and 5 (OPT)
8. Development of the underground medium according to the optimized development scheme (EXP).

A production scheme comprises the technical development parameters of the reservoir such as the following parameters: location of a production well or of an injection well, drilling mud composition, completion characteristics, selection of a hydrocarbon recovery method (such as waterflooding for example), and parameters required to implement this method (such as injection pressure, production flow rate, etc.).

1. Acquisition of Petrophysical Measurements Relative to the Medium and/or to the Fluid (ACQ)

In order to explore, evaluate and develop an underground reservoir, direct or indirect, static or dynamic measurements of this medium are performed.

The following static parameters are measured directly, for example by logs (measurements obtained after drilling, within the well) or of cores providing porosity, permeability, lithology and fracturation information, etc.

Seismic campaigns are also used to perform indirect measurements of the reservoir, by providing an image of the subsoil. These data are static or dynamic when they are repeated over time.

Dynamic parameters such as the pressure in the reservoir can also be measured directly.

2. Construction of a Geological Model (MG)

A mesh (grid) discretizing the reservoir into a set of cells is defined in order to construct a geological model. This mesh is referred to as "fine" because the cells are of small dimensions, and therefore numerous, so as to best represent the heterogeneities of the reservoir. A value of at least one petrophysical property is then associated with each cell of this first mesh. This property can be the porosity, the permeability, the lithology, etc.

This assignment is achieved by a geostatistical simulation. An example of a technique that can be used to carry out this stage is described in the following document:

Geostatistics: modeling spatial uncertainty, Jean-Paul Chilès, Pierre Delfiner, John Wiley & Sons, Inc., 1999.

Figure 2:
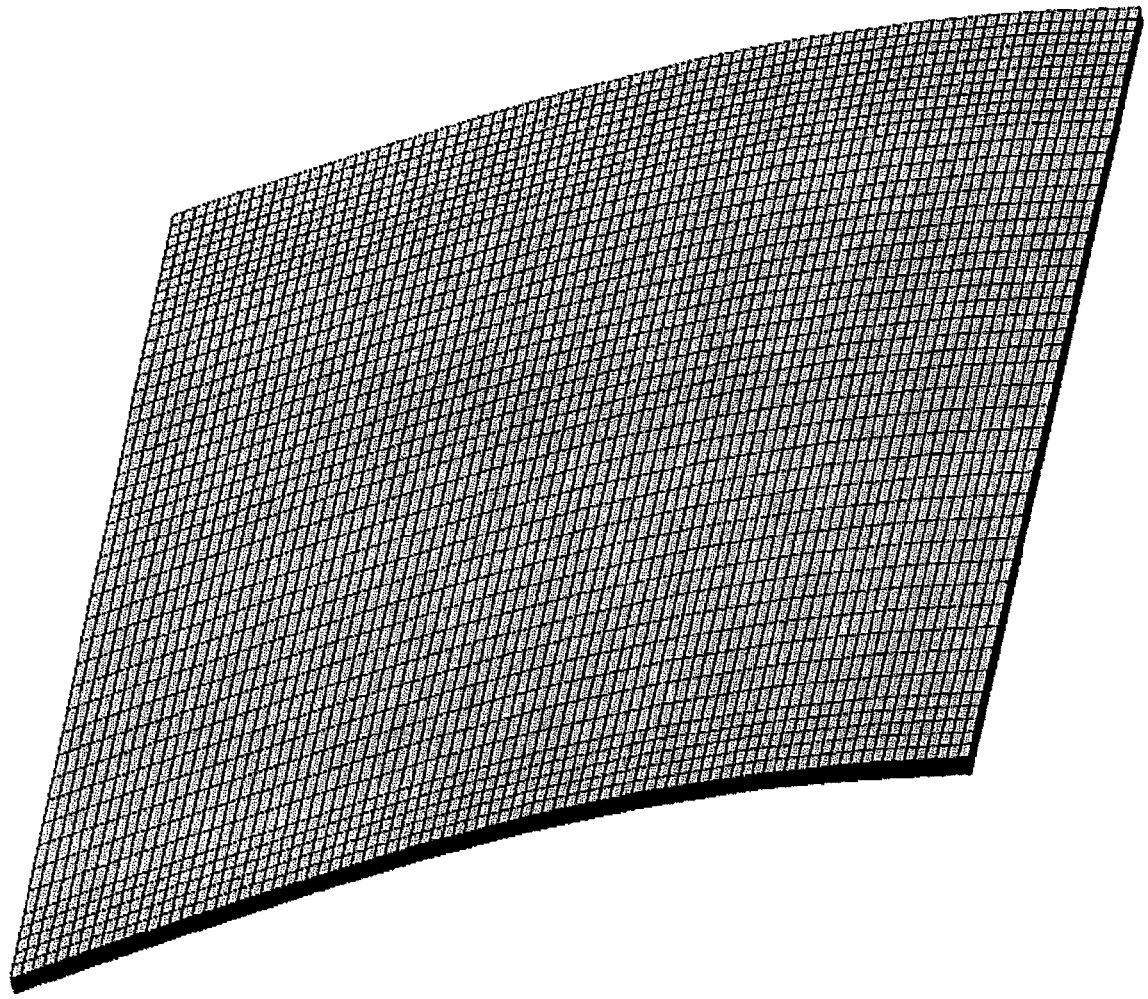
FIG. 2 shows an example of a geological model.

FIG. 2 shows an example of a geological model.

3. Construction of a Coarse Grid (GG)

A mesh (grid) discretizing the reservoir into a set of cells is defined in order to construct a reservoir model. This mesh is referred to as "coarse" because the cells are of larger dimensions, and therefore less numerous, than the cells of the fine mesh.

Figure 4:
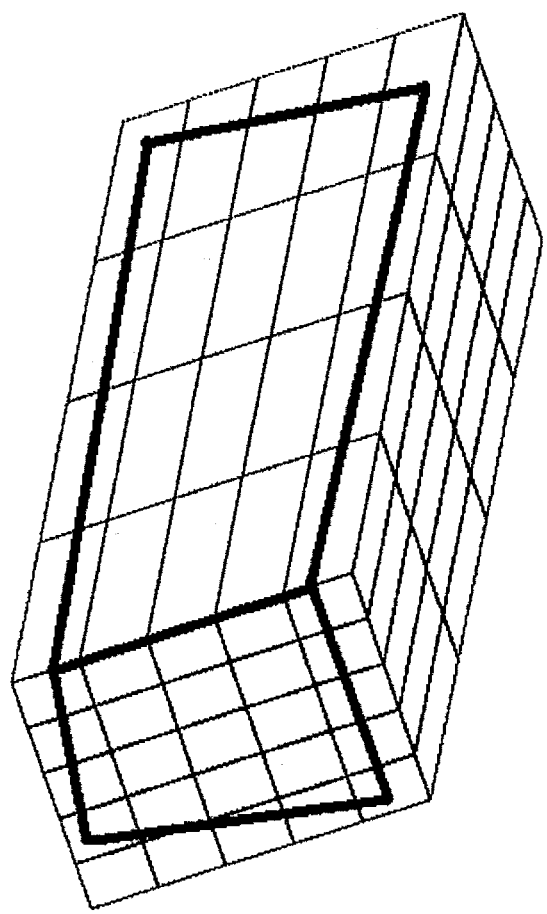
FIG. 4 illustrates the notion of geometrical links between the cells of the two models.

This second grid, the coarse grid (GG), thus forms a set of cells discretizing the reservoir. Each cell of this second grid contains a set of cells of the first grid, as illustrated in FIG. 4. It represents the grid of the reservoir model (MR).

Figure 3:
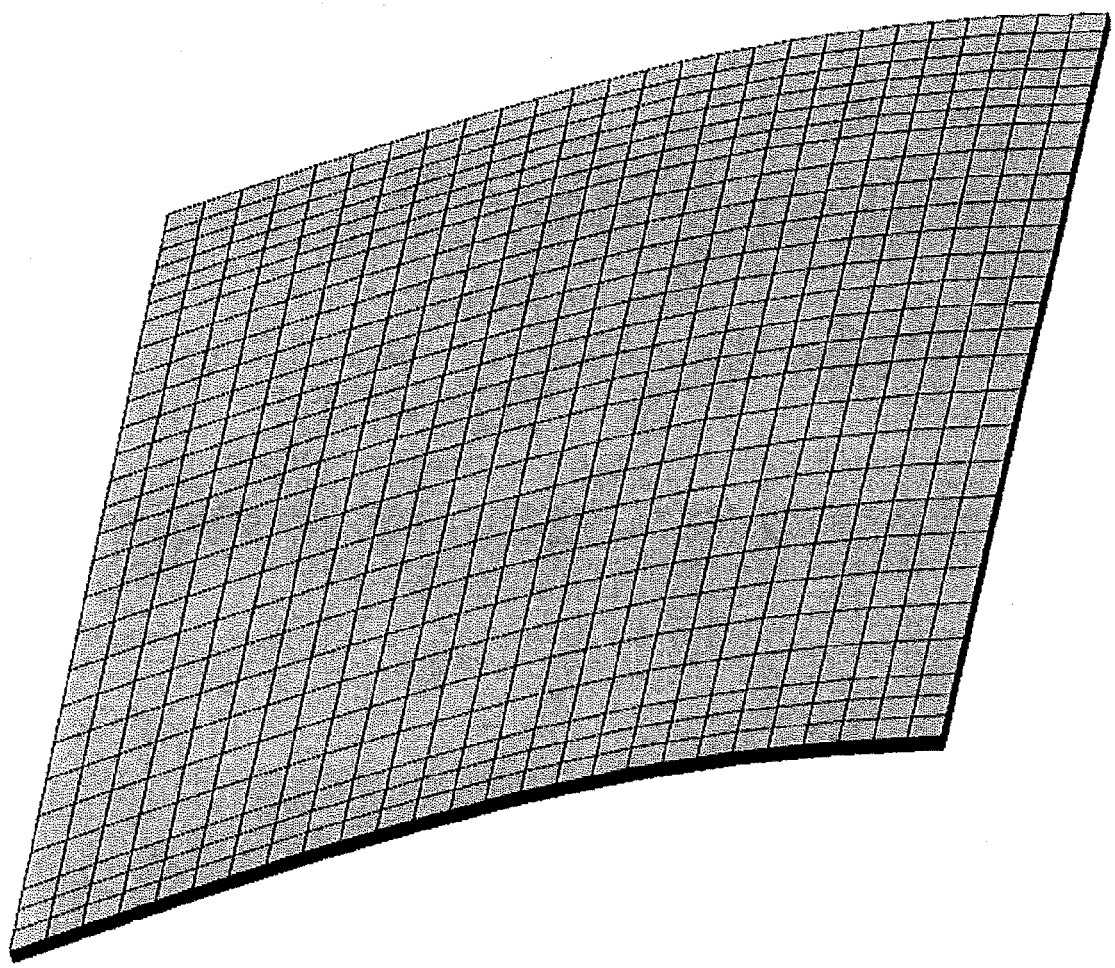
FIG. 3 is an example of a coarse grid of a reservoir model, corresponding to the fine grid of the geological model of FIG. 2.

FIG. 3 is an example of a coarse grid of the reservoir model corresponding to the fine grid of the geological model of FIG. 2.

4. Determination and Storage of Links Between the Cells of the Two Grids (MEM)

According to the invention, the geometrical links between the cells of the fine grid of the geological model and the cells of the coarse grid of the reservoir model are determined.

A geometrical link defines, for each cell of the grid of the geological model, the cell of the grid of the reservoir model with which it is associated in the reservoir model. FIG. 4 illustrates the geometrical links between the cells of the two models. The thick line represents a cell of the reservoir model and the thin lines represent the cells of the geological model. All the cells of the geological model contained in the cell represented with a thick line have a geometrical link with this cell of the reservoir model.

Determination of the belonging of a cell of the fine grid to a cell of the coarse grid is achieved from the coordinates of each cell. For example, it can be decided that a cell of the fine grid belongs to the cell of the coarse grid that contains the center of this cell of the fine grid.

When the simulation sequence is repeated, the geometry of the models remains unchanged. The geometrical links are thus always identical at each iteration. The stage of computing these geometrical links is potentially costly in computation time (even costlier than the properties upscaling computations). Storage of them is suggested.

Thus, according to the invention, these geometrical links are then saved the first time the simulation sequence is carried out, by storing them in a memory, such as a computer memory, in a database or in a file. Thus, when the process is repeated, these computations are no longer necessary, which generates substantial savings in computation time.

5. Construction of a Reservoir Model (MR)

To construct the reservoir model, a value of a petrophysical value (porosity, permeability, lithology, etc.) is associated with each cell of the second grid (coarse grid). This assignment is achieved through upscaling. For each cell of the coarse grid, an average of the petrophysical properties of the cells of the fine grid associated therewith is calculated.

An example of a technique that can be used to carry out this stage is described in the following document:

Calculating Equivalent Permeability: A Review, P. Renard and G. de Marsily, Advances in Water Resources 20(5-6), 253-278, 1997.

6. Flow Simulations (SIM)

Flow simulations allowing simulation of production parameters according to the production scheme which is selected are performed from the reservoir model which is software referred to as a "flow simulator". The production expected over the coming years can be determined for example.

The flow simulator marked as PumaFlow® (IFP Energies nouvelles, France) can, for example, be used.

An example of a technique that can be used to carry out this stage is described in the following document:

Petroleum Reservoir Simulation, K. Aziz and A. Settari, Applied Science Publishers, p. 476, 1979.

7. Optimization of the Production Scheme Through Iteration of Stages 2, 3 and 5 (OPT)

The sequence of four stages 2, 3, 5 and 6 (and optionally stage 1) is repeated many times to test different values of one or more parameters.

It is thus possible to modify:

the geostatistical simulation parameters, such as correlation lengths in a kriging technique, to obtain a geological model that best represents the heterogeneities of the reservoir from the measurements acquired in stage 1, the upscaling parameters, such as the parameters are used in the averaging formula (exponent for the power law) or the thresholds (cut-off), to obtain a more accurate reservoir model, the flow simulator parameters, such as the relative permeability curves, the capillary pressure curves, the contacts (water/oil, gas/oil), the well productivity indices, so as to better simulate the flows and to obtain predictions are used that are closer to actual measured parameters.

It is also possible to repeat the sequence of the four stages 2, 3, 5 and 6 (and optionally stage 1) in order to optimize the reservoir development and production scheme, by carrying out at least one of the following operations: sensitivity analysis and history matching.

History matching modifies the parameters of the reservoir model, such as permeabilities, porosities or well skins (representing near-well damages), fault connections, etc., in order to minimize the differences between the simulated and measured historical data. The parameters can be linked with geographic regions, such as permeabilities or porosities around one or more wells. The difference between real data and simulated data forms a functional referred to as objective function. The history matching problem is solved by minimizing this functional. The objective function is usually computed as the sum of squared errors between simulated data and measured data.

The advantage of not recalculating the geometrical links during these iterations is to accelerate the iterative processes (sensitivity study, calibration, model and flow simulation optimization) used in the petroleum industry.

At the end of these stages, the geological model and the reservoir model are coherent with the static data (porosity, permeability, 3S seismic, etc.) and the dynamic data (pressure, 4D seismic, etc.). The flow simulator is calibrated and the development parameters having an influence on the production are identified by the sensitivity analysis.

By selecting various scenarios, characterized for example by various respective injector and producer well sites, and by simulating the hydrocarbon production for each one according to stage 6, the scenario allowing optimizing the production of the fractured reservoir considered according to the technical and economic criteria chosen can be selected.

8. Development of the Underground Medium According to the Optimized Development Scheme (EXP)

The reservoir is developed by specialists according to this scenario allowing reservoir production to be optimized.

Application Example

The method according to the invention is applied to a simplified oil field case.

A geological model comprising 1390*480*45=30,024,000 fine cells is considered. This model is populated with petrophysical properties from geostatistical simulation tools. Furthermore, there are two reservoir models:

Model 1 consists of 139*48*9=60,048 cells,

Model 2 consists of 417*144*27=1,631,296 cells.

A sequence of simulation modules that is going to be repeated several times within the context of history matching is created. At each iteration, an attempt is made to improve the calibration by adjusting parameters of the geological model. The computation times required for the upscaling stage at the first iteration and at the next iterations are compared to quantify the gain in terms of computation time.

| | Computation time Iteration 1 | Computation time Next iterations | Gain (iteration 1/next iterations) |
|---|---|---|---|
| Model 1 | 8 minutes | 1 minute | 800% |
| Model 2 | 45 minutes | 6 minutes | 750% |

A very definite acceleration of the simulation is thus observed after the first iteration: storing the geometrical links between the models allows reduction of the computation times by 700 to 800%.

Such a time gain has the effect of enabling processing large volumes of data (several million cells) that are encountered for large-size reservoirs or very heterogeneous reservoirs where discretization has to be fine, and which cannot be processed under operational conditions with prior methods. This time gain also allows testing more parameters and therefore improving the production scheme and thus production itself.

The invention claimed is:

1. A method for optimizing developments of an underground medium containing a fluid according to a development scheme utilizing petrophysical measurements acquired relative to the medium and/or the fluid comprising the steps:

a) constructing a geological model with a programmed computer having a first grid having a set of cells discretizing the medium with a value of at least one petrophysical property being assigned to each cell from a geostatistical simulation and from the measurements;

b) constructing by upscaling the geological model a reservoir model having a second grid including a set of cells discretizing the medium with each cell of the second grid containing a set of cells of the first grid;

c) identifying for each cell of the second grid, cells of the first grid that are contained in the cell of the second grid by use of the coordinates of the cells of the first and second grids, defining a geometrical link between the identified cells of the first grid and the cell of the second grid and storing the links to reduce subsequent computer computation time;

d) performing flow simulations with a programmed computer using a reservoir simulator, the reservoir model, and the links;

e) repeating steps a), b) and d) without repeating c), by modifying parameters of at least the development scheme, the geostatistical simulation, the upscaling, and the flow simulation, to optimize the development scheme; and f) drilling wells according to the optimized development scheme for producing the fluid from the underground medium.

* * * * *